(12) United States Patent
Bock et al.

(10) Patent No.: US 9,571,215 B2
(45) Date of Patent: Feb. 14, 2017

(54) MEASURING TIME OFFSETS BETWEEN DEVICES WITH INDEPENDENT SILICON CLOCKS

(71) Applicants: Anthony S. Bock, Vancouver, WA (US); Kevin B. Stanton, Hillsboro, OR (US); Ohad Falik, Kfar Saba (IL); Mikal C. Hunsaker, El Dorado Hills, CA (US)

(72) Inventors: Anthony S. Bock, Vancouver, WA (US); Kevin B. Stanton, Hillsboro, OR (US); Ohad Falik, Kfar Saba (IL); Mikal C. Hunsaker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,154

(22) PCT Filed: Mar. 15, 2013

(86) PCT No.: PCT/US2013/032462
§ 371 (c)(1),
(2) Date: Jun. 26, 2013

(87) PCT Pub. No.: WO2014/014520
PCT Pub. Date: Jan. 23, 2014

(65) Prior Publication Data
US 2014/0334582 A1 Nov. 13, 2014

Related U.S. Application Data

(60) Provisional application No. 61/673,205, filed on Jul. 18, 2012, provisional application No. 61/673,208, (Continued)

(51) Int. Cl.
*G06F 1/12* (2006.01)
*G06F 13/42* (2006.01)
(Continued)

(52) U.S. Cl.
CPC ............ *H04J 3/0667* (2013.01); *H04J 3/0673* (2013.01); *H04J 3/0638* (2013.01); *H04J 3/0661* (2013.01);
(Continued)

(58) Field of Classification Search
CPC ... H04W 56/001; H04L 7/0016; H04L 7/0012; H04J 3/0638; H04J 3/0661
See application file for complete search history.

(56) References Cited

U.S. PATENT DOCUMENTS

| | | | | |
|---|---|---|---|---|
| 6,535,926 B1 * | 3/2003 | Esker | .................... | H04J 3/0638 709/248 |
| 7,660,366 B2 | 2/2010 | Picco et al. | | |

(Continued)

FOREIGN PATENT DOCUMENTS

| | | |
|---|---|---|
| CN | 101202617 A | 6/2008 |
| CN | 101388741 A | 3/2009 |

(Continued)

OTHER PUBLICATIONS

International Search Report and Written Opinion received for PCT Application No. PCT/US2013/032462, mailed on Aug. 21, 2013, 12 pages.

(Continued)

*Primary Examiner* — Xuxing Chen
(74) *Attorney, Agent, or Firm* — Alpine Technology Law Group LLC

(57) ABSTRACT

Methods and apparatus relating to measuring time offsets between devices with independent silicon clocks are described. In some embodiments, logic is provided to syn- (Continued)

chronize a first clock of a first agent with a second clock of a second agent based on one or more messages exchanged between the first agent and the second agent and a platform time. The first agent and the second agent are coupled via a link. Other embodiments are also disclosed and claimed.

17 Claims, 14 Drawing Sheets

Related U.S. Application Data filed on Jul. 18, 2012, provisional application No. 61/673,210, filed on Jul. 18, 2012, provisional application No. 61/673,212, filed on Jul. 18, 2012, provisional application No. 61/673,213, filed on Jul. 18, 2012.

(51) Int. Cl.
*H04L 5/00* (2006.01)
*H04L 7/00* (2006.01)
*H04J 3/06* (2006.01)
*H04W 56/00* (2009.01)

(52) U.S. Cl.
CPC ............ *H04J 3/0697* (2013.01); *H04L 7/0012* (2013.01); *H04L 7/0016* (2013.01); *H04W 56/001* (2013.01)

(56) References Cited

U.S. PATENT DOCUMENTS

| | | | |
|---|---|---|---|
| 2006/0109868 A1* | 5/2006 | Schopp | H04J 3/0638 370/503 |
| 2010/0329285 A1 | 12/2010 | Stanton et al. | |
| 2011/0035511 A1 | 2/2011 | Biederman | |
| 2011/0150005 A1* | 6/2011 | Chen | H04J 3/0667 370/503 |
| 2011/0276820 A1 | 11/2011 | Patel et al. | |
| 2012/0159001 A1 | 6/2012 | Liu et al. | |

FOREIGN PATENT DOCUMENTS

| | | |
|---|---|---|
| CN | 101937253 A | 1/2011 |
| KR | 10-2007-0083610 A | 8/2007 |
| TW | 533346 B | 5/2003 |
| TW | 201140281 A1 | 11/2011 |
| WO | 2011/067405 A1 | 6/2011 |
| WO | 2011067405 A1 | 6/2011 |

OTHER PUBLICATIONS

Office Action received for Chinese Application No. 201310435029. 8, mailed on Aug. 31, 2015, 9 pages.
Office Action and Search Report Received for Taiwan Patent Application No. 102125547, mailed on Jun. 24, 2015, 12 pages including 5 pages of English translation.
Office Action received for Taiwanese Patent Application No. 102125547, mailed on Jan. 22, 2016, 6 pages including 2 pages of English translation.

* cited by examiner

_US 9,571,215 B2_

MEASURING TIME OFFSETS BETWEEN DEVICES WITH INDEPENDENT SILICON CLOCKS

RELATED APPLICATIONS

The present disclosure is related to and claims priority from the following five United States Provisional patent applications, which are hereby incorporated herein for all purposes:
1. Application No. 61/673,205, entitled "PROTOCOL FOR MEASURING TIME OFFSETS BETWEEN DEVICES WITH INDEPENDENT SILICON CLOCKS", filed Jul. 18, 2012;
2. Application No. 61/673,208, entitled "TECHNIQUES FOR MEASURING TIME OFFSETS BETWEEN DEVICES WITH INDEPENDENT SILICON CLOCKS", filed Jul. 18, 2012;
3. Application No. 61/673,210, entitled "POWER CONSUMPTION REDUCTION WHEN MEASURING TIME OFFSETS BETWEEN DEVICES WITH INDEPENDENT SILICON CLOCKS", filed Jul. 18, 2012;
4. Application No. 61/673,212, entitled "POWER CONSUMPTION REDUCTION WHEN MEASURING TIME OFFSETS BETWEEN DEVICES WITH INDEPENDENT SILICON CLOCKS", filed Jul. 18, 2012; and
5. Application No. 61/673,213, entitled "TECHNIQUES FOR OPTIMIZING TIMING MEASUREMENT IN LOW POWER APPLICATIONS", filed Jul. 18, 2012.

FIELD

The present disclosure generally relates to the field of electronics. More particularly, an embodiment of the invention relates to measuring time offsets between devices with independent silicon clocks.

BACKGROUND

In modern computing systems, various devices may be interconnected via one or more links. These links allow for communication between the interconnected devices. However, when devices are interconnected, operational correctness may rely on clock synchronization between the devices. For example, if the interconnected devices are not synchronized accurately, data communication may be hindered. To maintain error free communication, the speed of a link between the devices may need to be decreased to allow for proper synchronization. This in turn lowers performance. Accordingly, accurateness of clock synchronization between interconnected devices may directly impact performance in a computing system.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1A:
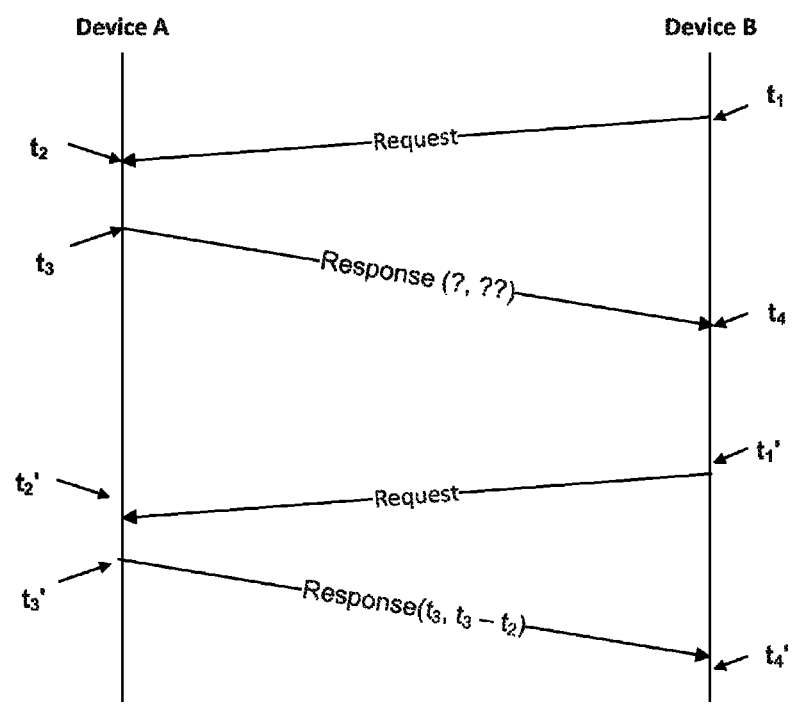
FIG. 1A illustrates a flow diagram of a timing measurement technique, according to an embodiment.

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

One limitation of silicon based clocks is that no two clocks may agree precisely on what time it is or how fast time is passing. Even if two clocks are forced to agree at a certain instant in time, they may immediately begin to drift apart. With high oscillator frequencies used in modern computing systems, an error of just a few parts per million may rapidly accumulate into substantial disagreement in clock values between devices. Also, applications and usage models that would benefit from precise synchronization between independent hardware clocks may not be practical given this limitation. Some solutions include proprietary mechanisms to chain clocks together or otherwise work around this limitation. In other cases, designers may resort to analog circuitry to eliminate dependencies on independent silicon clocks.

To this end, some embodiments provide a technique for achieving fine-grained time measurement between interconnected devices. In an embodiment, an interface used to interconnect devices in computer systems is Peripheral Component Interconnect Express (PCIe, e.g., in accordance with PCI Express Base Specification 3.0, Revision 3.0, version 1.0, Nov. 10, 2010). In one embodiment, independent devices periodically obtain a snapshot of a system-wide master time (e.g., that is used by all agents in the system). By simultaneously recording the value of their local clock and the system wide master time at a known point of time (e.g., and in the same units of time), devices may report the relationship between their local clock and the system wide master time (e.g., to a software application, operating system, etc.).

Some embodiments provide techniques for achieving fine-grained time measurement between interconnected devices, e.g., based on delivery of more timely data to a requesting device. Generally, timing information is always in flux within a digital logic system. Myriad small fluctuations in frequency between the various timing domains result in a steady loss of timing inaccuracy. Over time, these multiple sources of error may make it impossible to obtain timing information that is both accurate and precise.

Moreover, some embodiments enable a responding device to deliver more recent timing information to the requesting device. This approach reduces the impact of the many sources of error discussed above while reducing the need to request frequent updates to account for those sources of error. Also, such techniques improve the accuracy of timing information passed between devices, reduce power consumption, and/or preserve link bandwidth.

Accordingly, in an embodiment, no device needs any knowledge of the internal workings of any other device. If two devices implement the synchronization techniques discussed herein, then they are able to pass accurate timing information from one device to the other without any detailed knowledge of each other's operation. This in turn allows for relatively very-low-power, inter-device link(s) within a computing platform. However, embodiments of the invention are not limited to this aspect and the techniques may be applied more broadly to any type of networks or devices.

Some embodiments provide techniques for reducing power consumption when measuring time offsets between devices with independent silicon clocks. Generally, a problem arises when one device requests time from a second connected device over some transmission medium. The responding device then fetches the time from a reliable clock source for transmission to the requesting device. In this case, the responding device needs to account for the time consumed in retrieving the time before transmitting the answer to the requesting device. If not, then the retrieved value will be "stale" by the time it is transmitted.

One solution to this problem is to simply place the reliable time source in the responding device. However, this is not always practical in large systems where many devices may need access to reliable time. Another option is to keep a local copy of the time within the responding device. This copy would then always keep the same value as the original time source, removing the need to fetch time updates when servicing requests. This method does work, but it may consume more power than necessary as the copy needs to be continually updated.

In an embodiment, an interface used to interconnect devices in computer systems is PCIe. However, embodiments of the invention are not limited to this aspect and the techniques may be applied more broadly to any type of networks or devices.

Some embodiments provide techniques for reducing power consumption when measuring time offsets between devices with independent silicon clocks. For example, in cases where a remote time source provides a master time for synchronization purposes, the remote time master (such as an external device coupled to the system via a serial interface) may not be immediately able to respond. In such instances, the master might take so long that the requestor could erroneously conclude that the original request message was lost.

This mistaken "Timeout" conclusion could lead the requestor to take actions to recover from what it considers to be an error condition such as asking for the link to be reset, negotiating for a lower link speed, and/or reporting an error to software. These actions would clearly impact system performance due to the capturing of resources and could even result in rebooting the computer. One alternate solution to this problem would be to set the timeout to a very large value, which would have adverse effect on system efficiency.

To this end, an embodiment improves system performance by expanding the variety of devices that could serve as the master time source, e.g., by removing the requirement that the master time needs to be retrieved quickly enough to avoid the timeout condition described above.

In one embodiment, a message (also referred to herein as "NAK") enables a responding device to communicate to a requestor that while the responder acknowledges the receipt of the NAK message and is working on it, it will not have the timing information required to issue the response for some time. The requestor may then wait for some length of time and reissue the request message in response to receipt of the NAK message.

Some embodiments provide techniques for optimizing timing measurement in low power applications. For example, timing measurements may measure time offsets between devices with independent silicon clocks. Some embodiments relate to the distribution of timing data from a central time source to other devices with independent local clocks. One approach to this problem is to broadcast the time periodically from the central source to all participating devices. However, such an approach does not lend itself to aggressive power management policies needed by many portable devices.

In an embodiment, flow of requests for timing/synchronization data is reversed within a device hierarchy such that interested devices "pull" the time from the central time source rather than waiting for a broadcast. This greatly improves power efficiency and enables aggressive power management policies where devices would often be in too low a power state to receive a broadcast.

Some embodiments provide for bounded inaccuracy time synchronization, e.g., to simplify the transport of accurate time between and within chips. Furthermore, some embodiments discussed herein may be used in conjunction with or to otherwise advance protocols defined in Institute of Electrical and Electronics Engineers (IEEE) Standard 1588-2008, IEEE Standard 802.1AS-2011, and/or IEEE Standard 802.11v. While IEEE 802.1AS and IEEE 1588 describe how to synchronize time across a network to sometimes an accuracy of sub-microseconds, the protocol requires timers, computations, and complex state machines. To this end, some embodiments provide bounded inaccuracy time synchronization to simplify the transport of accurate time between and within chips. Additionally, such embodiments work where the latency/jitter of the bus is usually low, but they can detect a spurious high-latency/high-jitter event, and attempt the protocol again.

FIG. 1A illustrates a flow diagram of a timing measurement technique, according to an embodiment. Device A and B shown in FIG. 1A may be any type of device such as any of those discussed with reference to FIGS. 2-5. Also, Device A may be an upstream port and Device B may be a downstream port in various embodiments.

Referring to FIG. 1A, Device A may be aware of the relationship between a system wide master time and its own local clock. Also, Device A's local clock may actually be the system wide master time in an embodiment. Device B is in turn seeking an update of the system wide master time to associate with the current value of its local clock. As shown, Device B initiates the update by sending a Request message to Device A which then responds with a Response message. The precise times at which these messages are transmitted and received by each device are labeled t1 through t4. Each device captures these times in terms of or in relation to its own local clock as it transmits or receives each message.

For instance, after the first request/response pair in FIG. 1A, Device B has recorded times t1 and t4 based on its local clock. Similarly, Device A has recorded times t2 and t3 based on its local clock. With each subsequent response message, Device A sends the system wide master time of the previous response's transmission by device A (e.g., time t3) and the time Device A took to respond to the previous request (t3−t2). With this information, Device B may determine the relationship between the system wide master time and its own local clock.

Moreover, "Link Delay" may be defined as the time it takes for a particular message to transit the transmission medium. Assuming that there is no direct mechanism to measure this link delay, devices may use some technique to indirectly calculate this time. Otherwise, a timing value sent from one device will be stale when it reaches the other device. If the Link Delay for a particular medium is about equal in both directions, the above system of request/response pairs enables Device B to calculate the Link Delay using the following formula:

$$\text{Link Delay}=[(t4-t1)-(t3-t2)]/2$$

Given this Link Delay, Device B may calculate the system wide master time corresponding to its local clock time t4 as follows:

$$\text{MasterTime\_at\_}t4=t3+\text{Link Delay}$$

Device B may then store these two values, local and master times at t4, for later use by software or other logic.

Accordingly, in one embodiment, each device may know the deviation of its own local clock from the system wide master time. By accounting for these differences, logic may precisely synchronize events across multiple independent devices to the system wide master time without synchronizing the individual silicon clocks.

Some embodiments may allow for one or more of the following: (a) enabling devices to account for indeterminate Link Delay on the transmission medium; (b) enabling precise correlation between a device's local clock and the system wide master time; (c) using only two messages, preserving link bandwidth for other uses; (d) an implementation that is external to each device (e.g., neither device requires detailed knowledge of the other device's internal operation); (e) improves power efficiency by enabling devices in low power states to postpone issuing timing requests until the link is awake; and/or (f) minimizing the time lag between the execution of a particular Request/Response protocol and the passing of master time (e.g., t2 may be passed immediately to the requester even though t3−t2 is not made available at the same time—which is fine because t3−t2 may be used only to compute Link Delay, which is relatively static).

Additionally, an embodiment provides a new method for accurate time synchronization between devices without requiring extra wires or connections. Also, a 'slave' device may request time rather than the master pushing time, allowing the slave device to stay in a low-power state longer.

In some embodiments, the technique shown in FIG. 1A enables the determination of the Link Delay between the two devices and the transmission of precise timing information from Device A to Device B. At the conclusion of the second (and every subsequent) response message from Device A, Device B may calculate the Master Time value corresponding to its local time value t4 by adding the Link Delay to the transmitted value, t3.

Figure 1B:
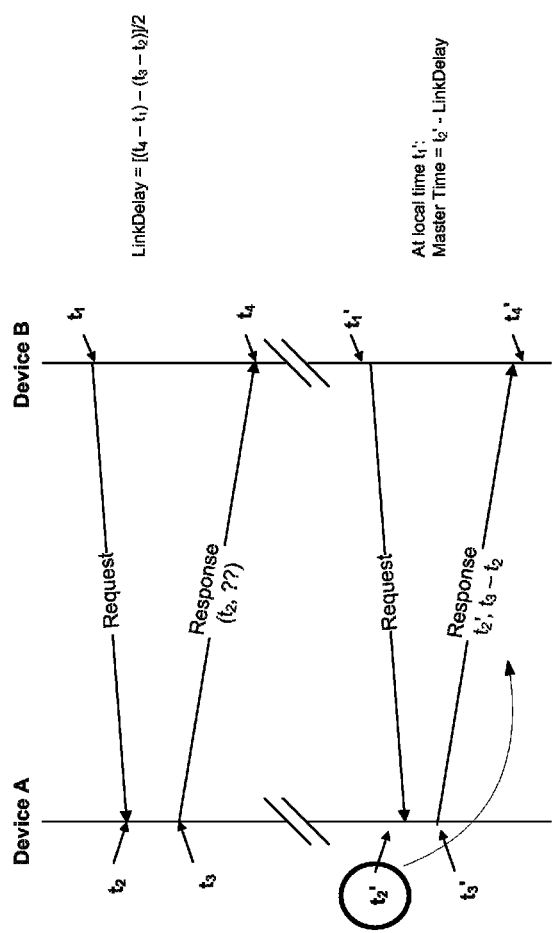
FIG. 1B illustrates a flow diagram of timing measurement techniques, according to some embodiments.

FIG. 1B illustrates a flow diagram of timing measurement techniques, according to some embodiments. Device A and B shown in FIG. 1B may be any type of device such as any of those discussed with reference to FIGS. 2-5. Also, Device A may be an upstream port and Device B may be a downstream port in various embodiments.

Referring to FIG. 1B, an alternative technique for time synchronization is shown, according to an embodiment. As shown, relative to FIG. 1A, in the response message, the value passed for the master time at t3 has been replaced with the master time value at t2'. Device B now calculates the master time at point t1' by subtracting the calculated Link Delay from the master time at t2' as sent by Device A.

Furthermore, the PCIe specification may dictate that the protocol populates messages with settled data. Any value sent will therefore be from some event in the past, not from the current message. This precludes sending the master time value at t3' because that would be part of the current message and lead to trouble if the current message does not go through successfully. Given this consideration, t2' is the next most recent value.

Passing t2' from the current request message rather than t3 from the last response message greatly reduces one potential source of error: the fact that the interval between t4 and t1' may be arbitrarily long. During this interval, small errors from uncertainty in the various clock sources continue to accumulate, reducing the accuracy of any subsequent calculations based on the increasingly stale value captured at time t3. The issue here is that while t3 would have been accurate when it was captured, its value in calculating the relationship between the two clock domains degrades as time passes. These same sources of error apply to time t2', but may have had much less opportunity to accumulate as the interval between the receipt of the request message and transmission of the associated response may typically be quite short.

In addition to improving the accuracy of the resulting calculation by Device B, this technique also contributes to device power savings and preserving link bandwidth. By reducing the effort required to keep the interval between request messages short, this approach reduces the need to send repeated messages in order to maintain an acceptable level of accuracy. Under some circumstances, if the interval between requests were sufficiently long, two requests would need to be issued to obtain an accurate time value: one to refresh Device A's notion of t3 and another to transmit that value to Device B. With the approach of FIG. 1B such a scenario would not occur.

Figure 1C:
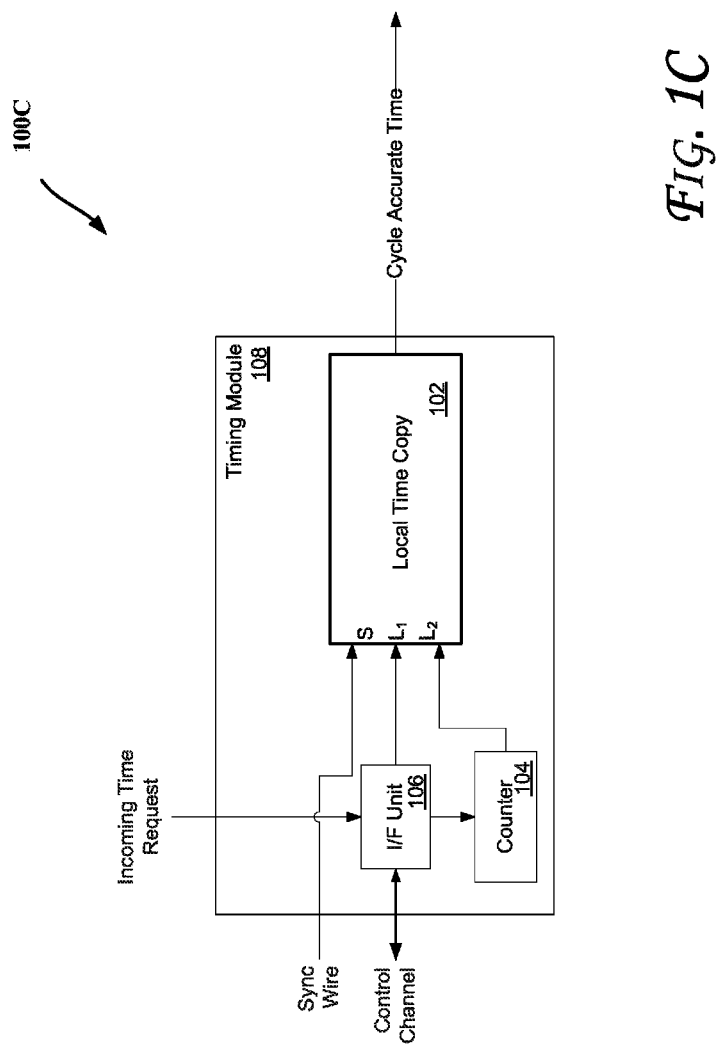
FIG. 1C illustrates a block diagram of a time synchronization logic 100C, according to an embodiment.

FIG. 1C illustrates a block diagram of a time synchronization logic 100C, according to an embodiment. Logic 100C may be incorporated into various devices, such as any of the devices discussed with reference to FIGS. 1D-5. As shown, logic 100C includes a storage device for the local time copy 102 and a counter 104 (e.g., within the responding device). In an embodiment, the local copy is only used when servicing requests for time from other devices. The counter keeps track of consumed clock cycles while the time is fetched, allowing the local copy logic to remain dormant until a request arrives. This mechanism retains the flexibility of having a central time source, while consuming less power than the always-on copy alternative.

Further, in the embodiment shown in FIG. 1C, incoming time requests arrive from external sources. The interface module/unit logic 106 then sends a message to the off-chip time source requesting a time update and starts a local counter 104. Later, when the update arrives, the off-chip time source pulses the sync wire to indicate that the current time as delivered to the interface unit is correct. This pulse causes the timing module logic 108 to latch the reported value. The local time copy 102 is then output as the sum of the reported timing value and the local counter. The local counter continues to run, updating the local time copy with each passing clock tick until the time is consumed to fulfill the original time request. At this point, the Local Time Copy may be discarded and the Counter de-energized until the arrival of the next time request. This mechanism results in a cycle accurate value with which to fulfill the original time request without the need to consume additional power maintaining a continuously running local copy of the remote time source.

Figure 1D:
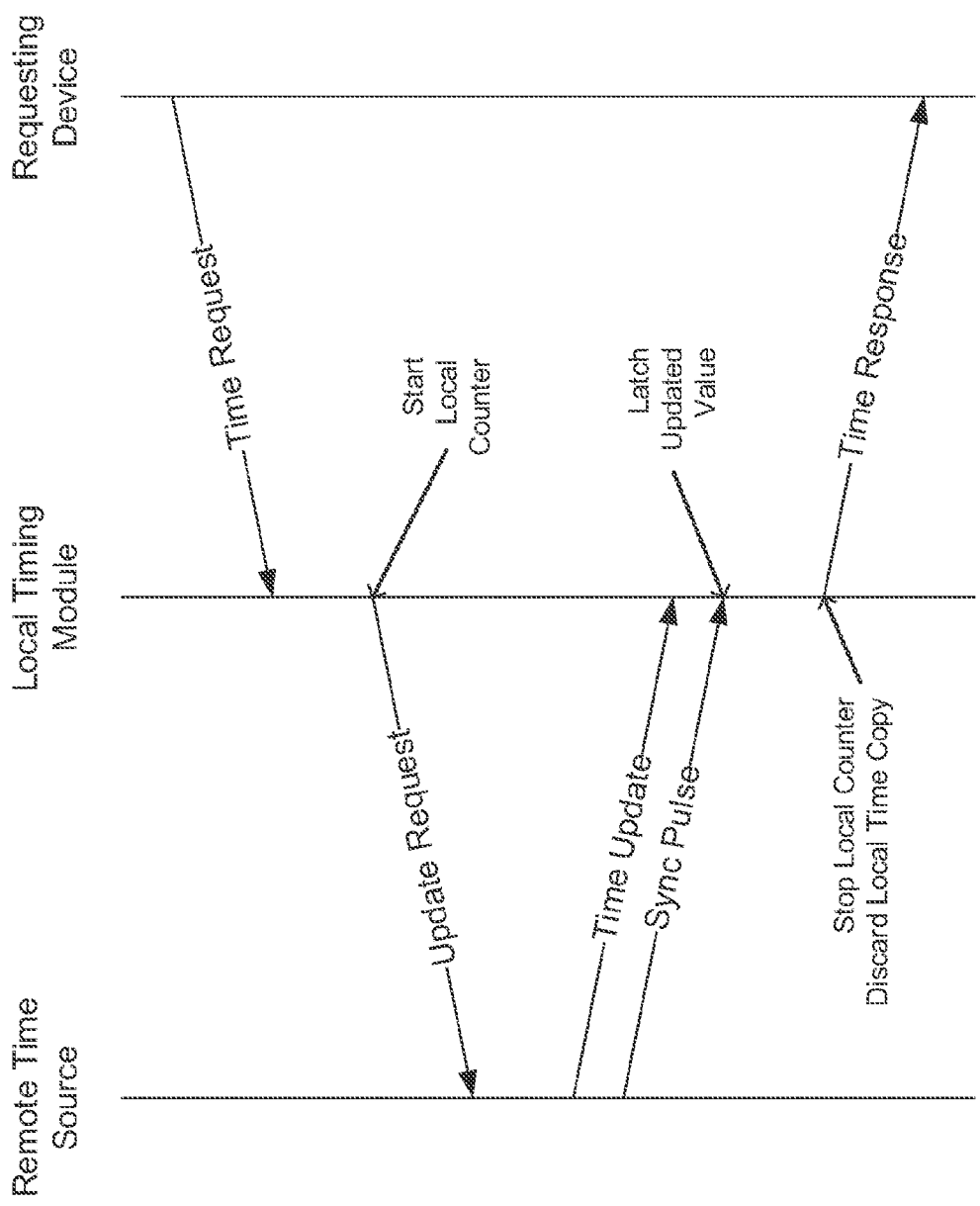
FIG. 1D illustrates a flow diagram for the exchange of control and data information with respect to time, according to an embodiment.

FIG. 1D illustrates a flow diagram for the exchange of control and data information with respect to time, according to an embodiment. In some embodiments, each of the remote time source, local timing module, and the requesting device may be provided in an agent in a system, such as components of the systems discussed with reference to FIGS. 2-5. More specifically, FIG. 1D shows those points where the local counter (e.g., counter 104 of FIG. 1C) is activated and deactivated.

As shown in FIG. 1D, a requesting device sends a time request to a local timing module (e.g., module 108 of FIG. 1C). In response to the time request, the module starts its local counter (e.g., counter 104 of FIG. 1C) and sends an update request to a remote time source. Upon receipt of time updates form the remote time source, the local timing module latches/stores the updated values (e.g., as discussed with reference to FIG. 1C). In an embodiment, the time update may arrive with (or at substantially the same time as) a synchronization pulse. Subsequently, the local timing module may provide the appropriate response (e.g., as discussed with reference to FIG. 1C) to the requesting device. The local timing module may also stop the local counter at this point and effectively discard the local time copy, in accordance with an embodiment.

Figure 1E:
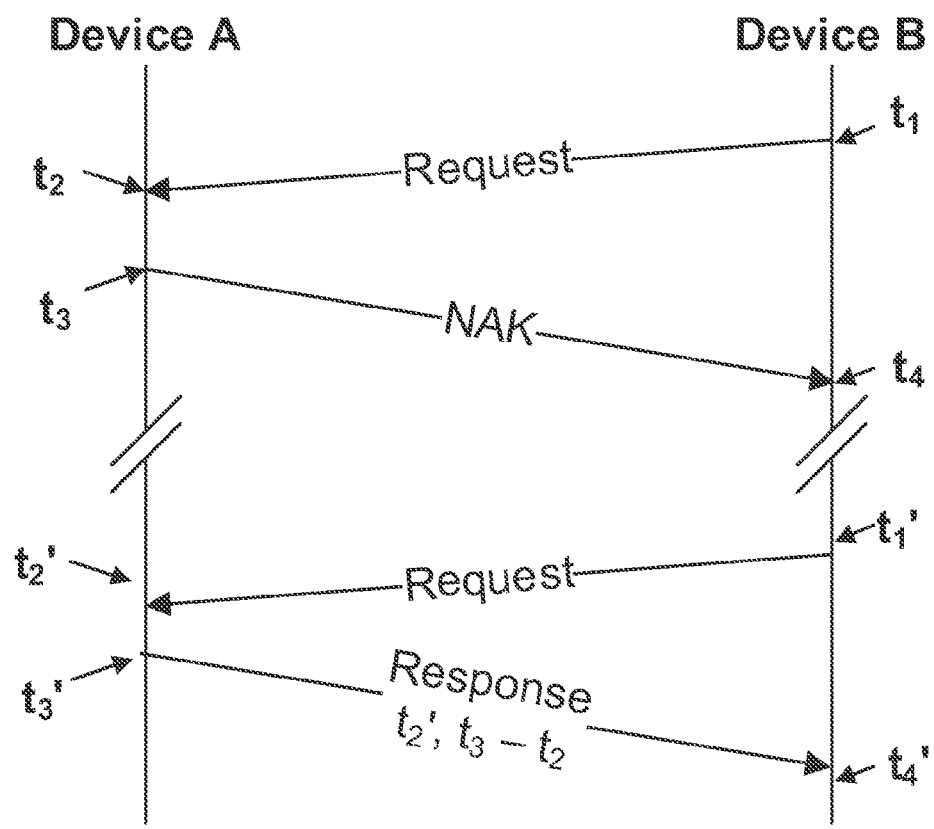
FIG. 1E illustrates a timing measurement protocol with the addition of the NAK message, according to an embodiment.

Referring to FIG. 1E, a timing measurement protocol with the addition of the NAK message is shown, according to an embodiment. As shown in FIG. 1E, the first request (t1→t2) results in a NAK message. The responder (Device A), upon receiving the request for time, decides that it does not have sufficient information for a complete response message, and so issues the NAK instead. The requestor (Device B) now knows to wait some (e.g., implementation-specific) length of time before reissuing the request. Subsequent requests may also receive NAK messages until the responder has obtained the needed information for a complete response message.

In an embodiment, the NAK message allows the Responder to confirm that it has received the initial request while it continues to work on gathering the response data. This avoids the undesirable alternatives of either extending the transmission medium's transaction timeout value simply to accommodate this one particular event or running the risk of triggering a transaction timeout condition. The NAK message may be a dedicated response or use a reserved time value (such as all '1') as part of the standard response in one embodiment.

Accordingly, some embodiments relax the constraints in designing a system that supports precision time measurement. Without the addition of the NAK message, implementers would be restrained in their selection of master time sources and in how they service timing requests from other devices. One constraint (originating from the requirements of the transmission medium) comes from the fact that all messages need to be serviced within a certain time or the originator may conclude that the timing request was never received. Issuing a NAK message makes sure this would not happen while allotting more time for the responder to gather the needed data.

Figure 1F:
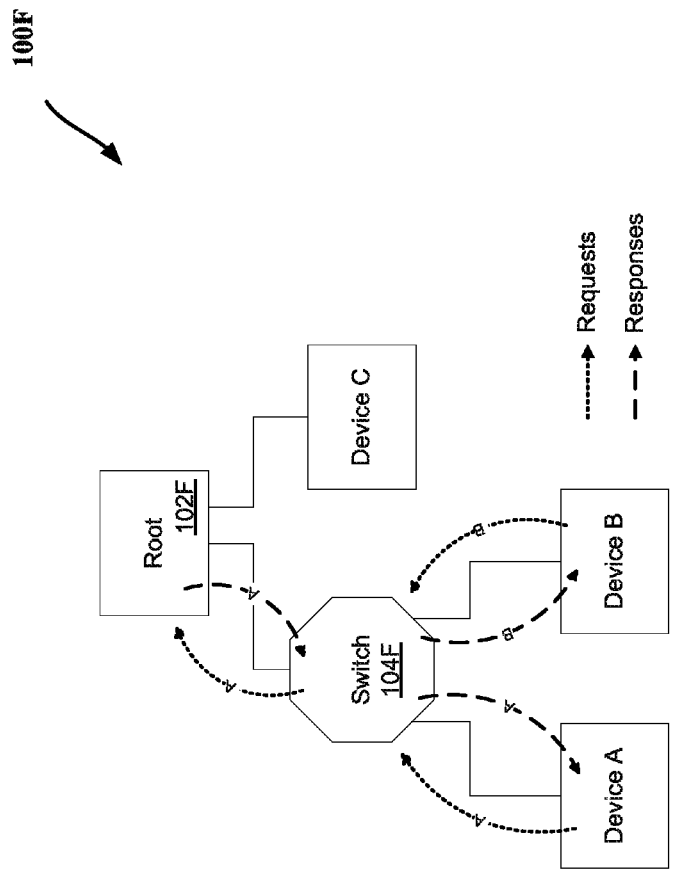
FIG. 1F illustrates a block diagram of timing measurement logic utilizing a "pull" model, according to an embodiment.

FIG. 1F illustrates a block diagram of timing measurement logic 100F utilizing a "pull" model, according to an embodiment. Logic 100F may be incorporated into various devices, such as any of the devices discussed with reference to FIGS. 2-5. For example, logic 100F may include a root complex 102F (which may be the same or similar to the RC 222 discussed with reference to the remaining figures).

Generally, when distributing time information within a hierarchy, a root device may maintain the master time and periodically broadcast timing messages to all participating devices. This approach consumes power to broadcast all of the messages whether the recipients actually need them right then or not. Additionally, all of the intervening links may remain energized so that the recipients may receive the messages and the devices themselves may remain in a higher power state to accept incoming traffic.

Referring to FIG. 1F, an embodiment of a device hierarchy is shown. In an embodiment, one or more devices may ask for the time only when they need it. If the device receiving the request has a valid value for the time, it provides it immediately to the requestor. Otherwise, the receiver issues its own timing request to the device above it in the hierarchy. This process continues until a request reaches a device with an up-to-date master time value. Note that the root of the hierarchy will always have a valid master time value in an embodiment. Also, the switch attached to the root may be a time master in some embodiments. In this case, only devices attached to that switch may have access to precise time and the root itself would not participate in fulfilling responses to time requests in accordance with at least one embodiment.

For example, if Device A requests time and a switch 104F does not have it, the switch may in turn issue its own request for time to the next device above it in the hierarchy (i.e., to the root 102F). When the time arrives from the root 102F, the switch fulfills Device A's request.

Also, if Device C does not need the time at an instant, it does not send any messages, which in turn reduces power consumption (e.g., because Device C may enter a lower power consumption state) and/or preserves bandwidth on the links in the logic 100F (e.g., as no traffic is generated by Device C).

Furthermore, Device B may request time at a later point. Having just updated its own time to answer Device A's request, the switch may fulfill Device B's request (e.g., instead of generating additional traffic to root 102F). In an embodiment, the switch 104F may first determine whether its time is still considered valid and not stale before fulfilling Device B's request with the switch's time, e.g., based on a threshold value and/or timer value that keeps track of how recently the switch time was updated.

Because devices have full knowledge of when they need the time, and only ask for time when needed, timing information may typically be passed much less frequently than with the broadcast model. The latter periodically broadcasts timing data with no knowledge of which devices actually need it which in turn may consume additional power and consume bandwidth over the links. Also, as there is no need to remain awake for a broadcast message, devices are free to enter low power states and even power down their PCIe links without the risk of losing timing data. Later, when the device wakes up with work to do, it may issue a timing request at that point. As discussed herein, reference to "PCI" or "PCIe" is not limited to such devices only and these terms may be interchangeable with "communication links"

FIGS. 1G-1J illustrate flow diagrams for provision of bounded inaccuracy time synchronization, e.g., to simplify the transport of accurate time between and within chips, in accordance with some embodiments. Additionally, such embodiments work where the latency/jitter of the bus is usually low, but they can detect a spurious high-latency/high-jitter event, and attempt the protocol again (e.g., as shown by retries of FIGS. 1G-1I).

Referring to FIGS. 1G-1J, one device is considered the time-source and is labeled as "Platform Time Counter"). As shown, message passing is used to communicate the time-source's time to all of the relevant modules (one is denoted as Module X in FIGS. 1G-1J). Module X has a control unit to communicate with the Time Sync unit and a local counter to count local time. The time-source sends messages to the Time Sync unit that interfaces with Module X control unit.

Figure 1G:
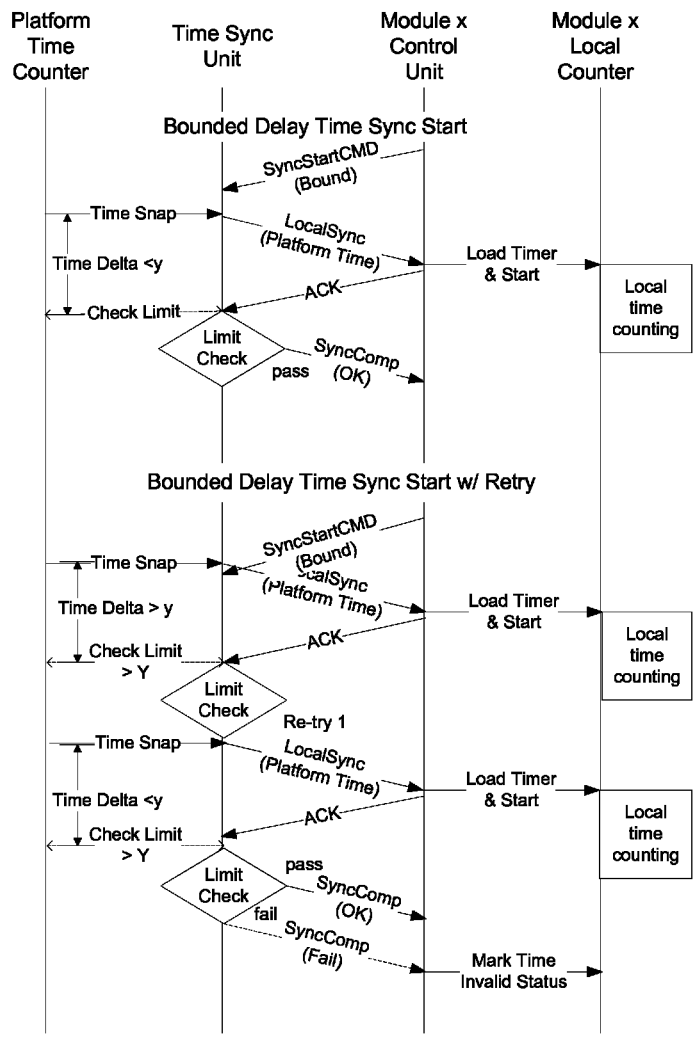
FIG. 1G illustrates a flow diagram for provision of bounded inaccuracy time synchronization, according to an embodiment.

Referring to FIG. 1G, a command (such as a synchronization start command (SyncStartCMD) starts the bounding process. A time snap signal is then sent which causes the Time Sync unit to capture a snapshot of the current platform time value. This captured value is then forwarded to the Module X control unit. The Module X control unit synchronizes its local clock to the platform time by starting its local timer using the supplied platform time snapshot a starting value. An acknowledgement (ACK) is then returned to the Time Sync unit, which performs a limit check, e.g.: comparing the time delta between transmission of the time snap signal and receipt of the ACK message from the Module X control unit against a threshold (y). This limit check consists of comparing the value of the Platform Time counter at the time the ACK message is received against the stored value captured at the time snap signal. If the elapsed time delta is less than the threshold (y), the limit check succeeds. The Time Sync unit then sends a synchronization comparison pass message (via SyncComp(OK)) to the Module X control unit. The afore-mentioned flow is for the time delta being less than the threshold (y). If, however, the time delta is greater than the threshold (y), this indicates that the delay in transmitting the captured Platform Time value was so long that the value is now too stale to be relied upon. The Time Sync unit causes a retry until the time delta is below the threshold (y). In an embodiment, a synchronization comparison failure (SyncComp(Fail)) may be sent if a retry had to be attempted to mark the time as having an invalid status.

Figure 1H:
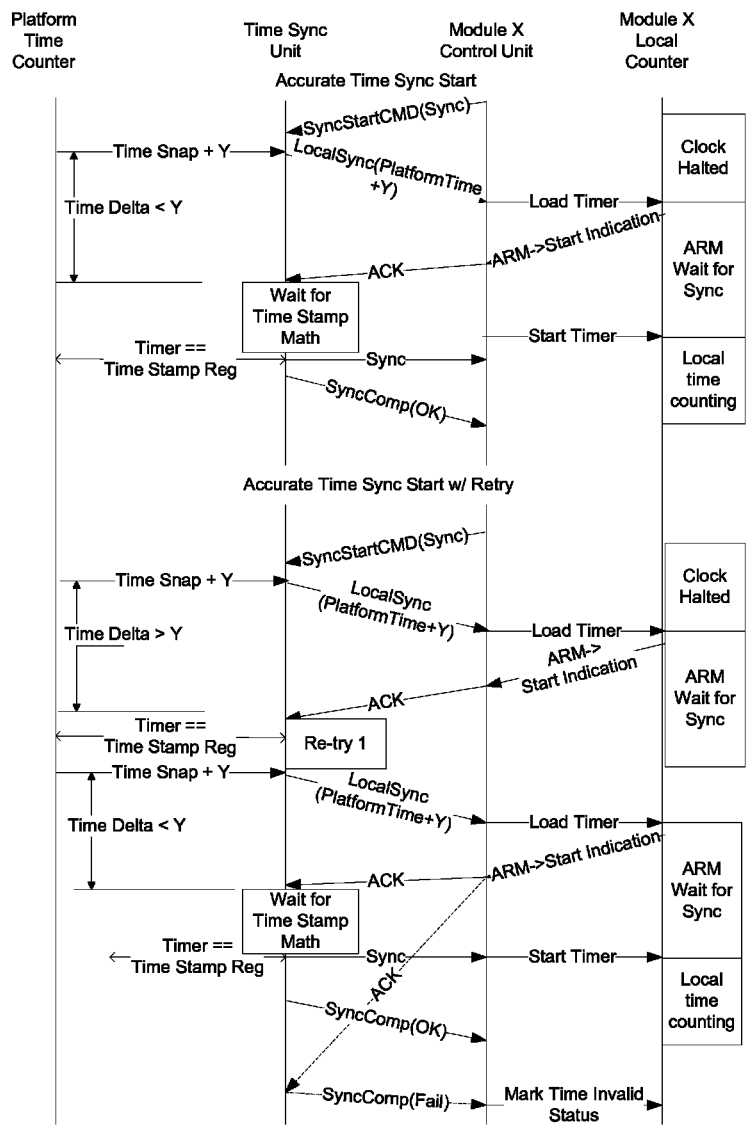
FIG. 1H illustrates a flow diagram for provision of bounded inaccuracy time synchronization, according to an embodiment.

Referring to FIG. 1H, the flow of FIG. 1G is generally followed except that the Time Sync unit passes a future time value, Platform Time plus an offset (Y), to the Module X control unit. The Module X local counter halts its clock and delays the start of its timer until the Time Sync unit sends the Sync signal. The Module X local timer loads the future time value into its registers and sends an Arm start indication to convey that it is ready for the Sync signal. This signal indicates that the current platform time now matches the time value sent in the LocalSync(PlatformTime+Y) message.

Figure 1I:
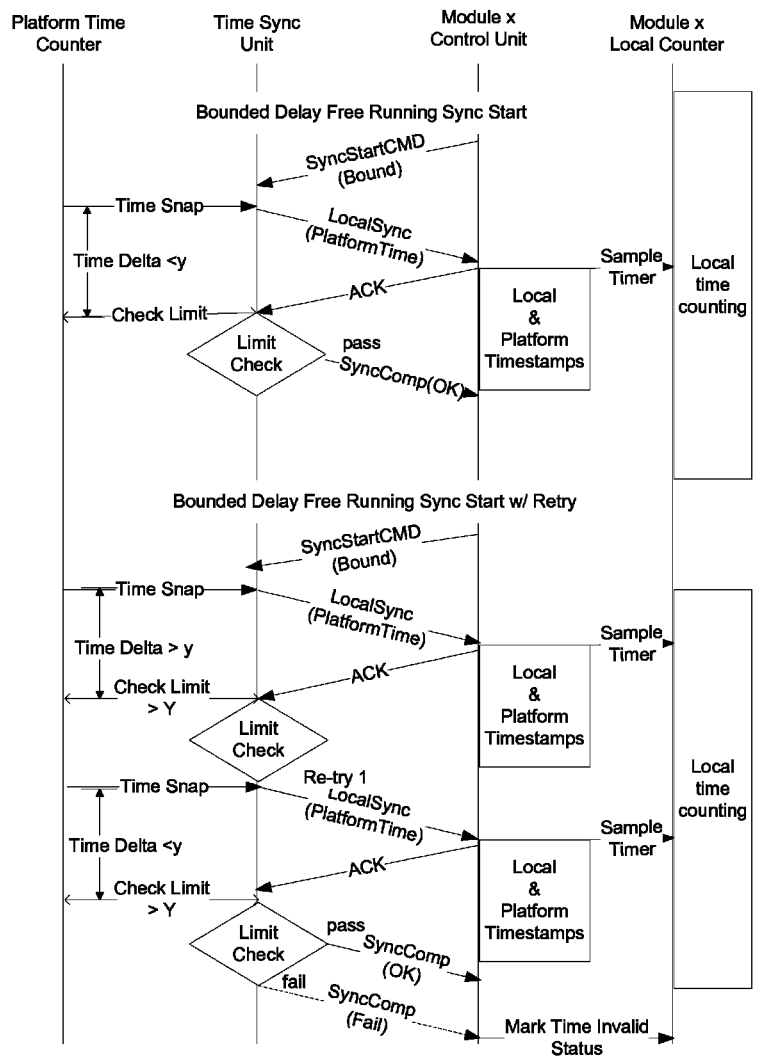
FIG. 1I illustrates a flow diagram for provision of bounded inaccuracy time synchronization, according to an embodiment.

Referring to FIG. 1I, the flow of FIG. 1G is generally followed except that the module X control unit stores a pair of timing value snapshots or timestamps: one for its local free running counter and another for the platform time counter. In response to the local synchronization message, the Module X control unit samples the current value of the Module X local counter and stores that value along with the Platform Time value provided in the local synchronization message.

Figure 1J:
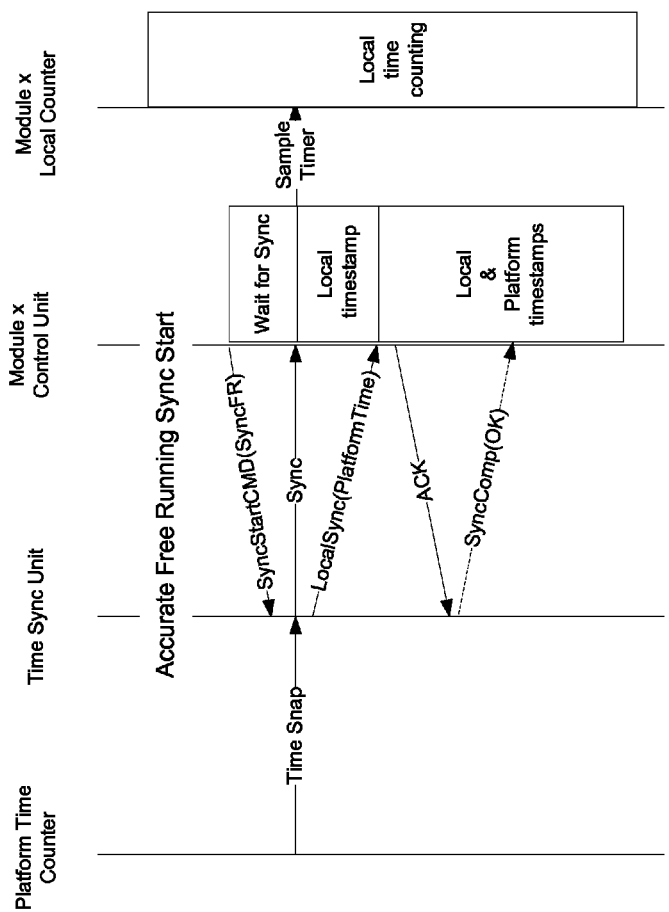
FIG. 1J illustrates a flow diagram for provision of bounded inaccuracy time synchronization, according to an embodiment.

Referring to FIG. 1J, the flow of FIG. 1I is generally followed except that this flow employs a synchronization signal (Sync) to enable the Module X Control Unit to sample the value of its free running Local Time counter at the same instant the Time Sync unit samples the value of the Platform Time counter.

FIGS. 1G and 1H show message flows for cases where the module X wants its Local Time counter to contain the same value as the Platform Time counter. FIGS. 1I and 1J show message flows for cases where the module X already has an independent clock (e.g., an audio interface module that counts one more every time it sends a sample to the codec (coder/decoder). Moreover, the flows shown in FIGS. 1G and 1I do not require any connection between the two units except the bus, but the accuracy may more limited when compared to the flows 1H and 1J that employ a wire between the two units (allowing a more-or-less simultaneous capture of time information) and relatively much better accuracy.

Furthermore, some embodiments discussed herein may be used in conjunction with or to otherwise advance protocols defined in Institute of Electrical and Electronics Engineers (IEEE) Standard 1588-2008, IEEE Standard 802.1AS-2011, and/or IEEE Standard 802.11v.

Also, the techniques discussed herein may be used to facilitate time/clock synchronization between various devices in a computing system, including for example in processor(s), chipset(s), System on Chip device(s), networking device(s) (such as Local Area Network (LAN) and/or Wireless LAN) devices), etc. such as the devices discussed herein with reference to any of the remaining FIGS. 2-5.

Figure 2:
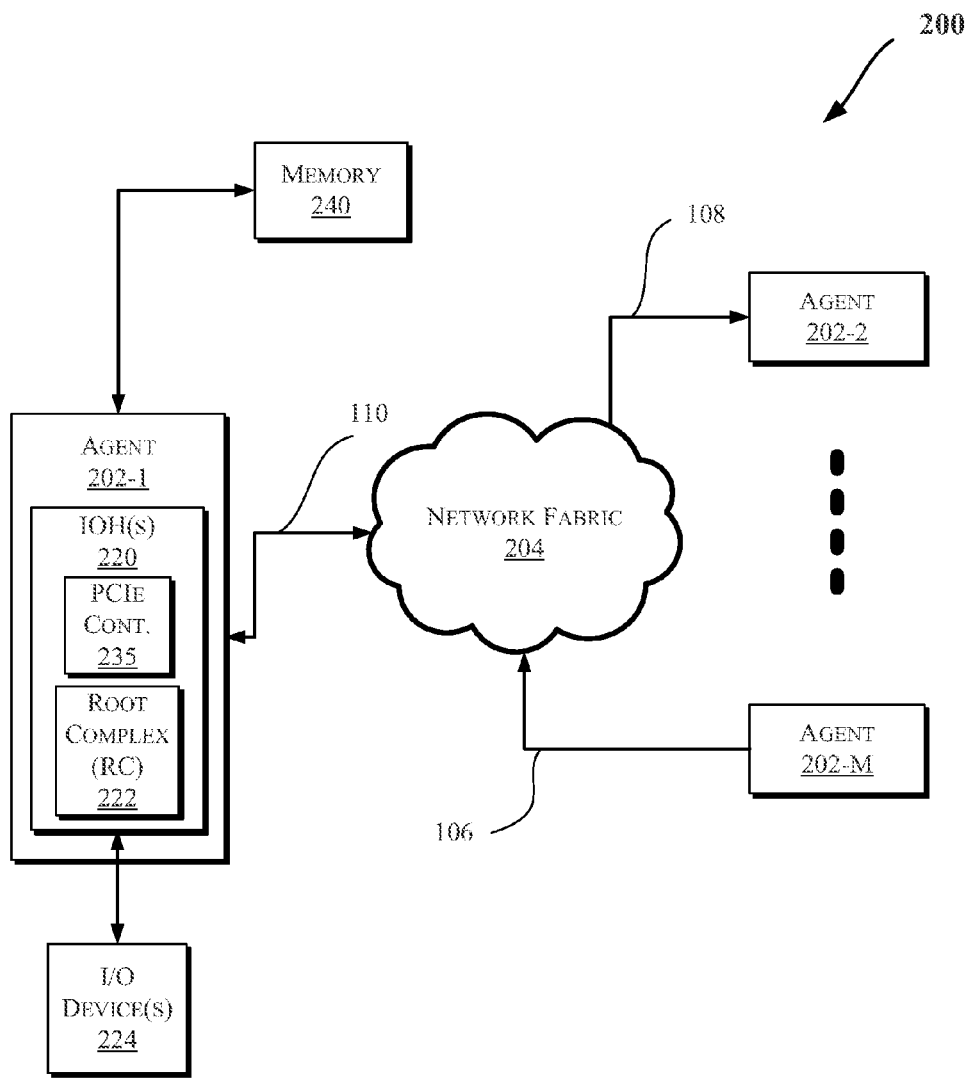
FIG. 2 illustrates a block diagram of an embodiment of a computing system, which is utilized to implement various embodiments discussed herein.

More particularly, FIG. 2 illustrates a block diagram of a computing system 200, according to an embodiment of the invention. The system 200 includes one or more agents 202-1 through 202-M (collectively referred to herein as "agents 202" or more generally "agent 202"). In an embodiment, the agents 202 are components of a computing system, such as the computing systems discussed with reference to FIGS. 3-5.

As illustrated in FIG. 2, the agents 202 communicate via a network fabric 204. In an embodiment, the network fabric 204 can include one or more interconnects (or interconnection networks) that communicate via a serial (e.g., point-to-point) link and/or a shared communication network. Each link may include one or more lanes. For example, some embodiments can facilitate component debug or validation on links that allow communication with fully buffered dual in-line memory modules (FBD), e.g., where the FBD link is a serial link for coupling memory modules to a host controller device (such as a processor or memory hub). Debug information is transmitted from the FBD channel host such that the debug information is observed along the channel by channel traffic trace capture tools (such as one or more logic analyzers).

In one embodiment, the system 200 can support a layered protocol scheme, which includes a physical layer, a link layer, a routing layer, a transport layer, and/or a protocol layer. The fabric 204 further facilitates transmission of data (e.g., in form of packets) from one protocol (e.g., caching processor or caching aware memory controller) to another protocol for a point-to-point network. Also, in some embodiments, the network fabric 204 can provide communication that adheres to one or more cache coherent protocols.

Furthermore, as shown by the direction of arrows in FIG. 2, the agents 202 transmit and/or receive data via the network fabric 204. Hence, some agents utilize a unidirectional link while others utilize a bidirectional link for communication. For instance, one or more agents (such as agent 202-M) transmit data (e.g., via a unidirectional link 206), other agent(s) (such as agent 202-2) receive data (e.g., via a unidirectional link 208), while some agent(s) (such as agent 202-1) both transmit and receive data (e.g., via a bidirectional link 210).

Also, in accordance with an embodiment, one or more of the agents 202 include one or more Input/Output Hubs (IOHs) 220 to facilitate communication between an agent (e.g., agent 202-1 shown) and one or more Input/Output ("I/O" or "IO") devices 224 (such as PCIe I/O devices). The IOH 220 includes a Root Complex (RC) 222 (that includes one or more root ports) to couple and/or facilitate communication between components of the agent 202-1 (such as a processor, memory subsystem, etc.) and the I/O devices 224 in accordance with PCIe specification (e.g., in accordance with PCI Express Base Specification 3.0, also referred to as PCIe 3.0 or PCI Gen3 or PCIe Gen3). In some embodiments, one or more components of a multi-agent system (such as processor core, chipset, input/output hub, memory controller, etc.) include the RC 222 and/or IOHs 220, as will be further discussed with reference to the remaining figures.

Additionally, the agent 202 may include a PCIe controller 235 to manage various operations of a PCIe interface including for example power management or time synchronization features/aspects of PCIe components in the agent 202, e.g., as discussed with reference to FIG. 1A. Further, as illustrated in FIG. 2, the agent 202-1 may have access to a memory 240. As will be further discussed with reference to FIGS. 3-5, the memory 240 may store various items including for example an OS, a device driver, etc.

Figure 3:
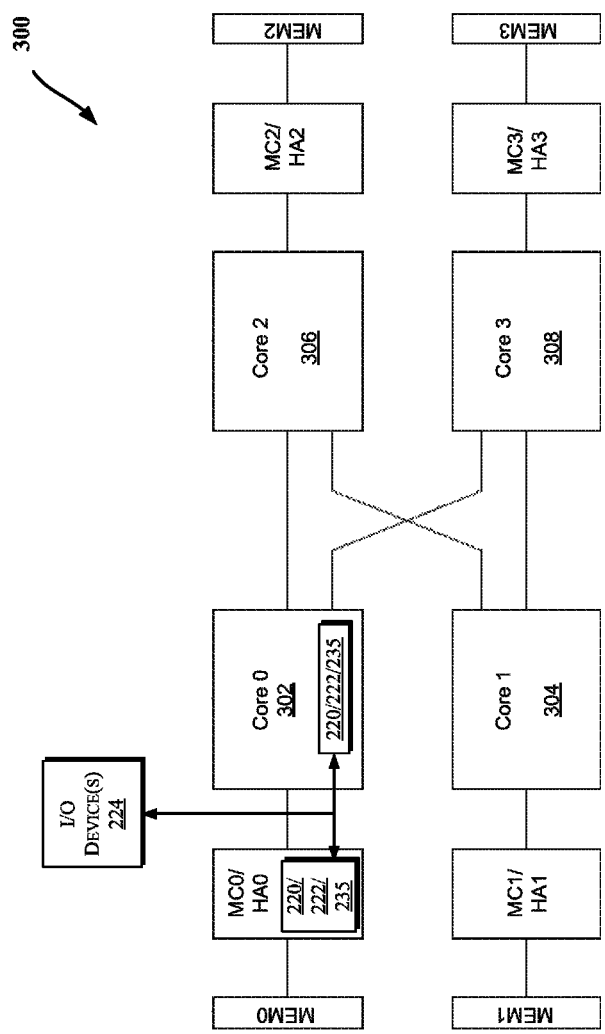
FIG. 3 illustrates a block diagram of an embodiment of a computing system, which is utilized to implement various embodiments discussed herein.

More specifically, FIG. 3 is a block diagram of a computing system 300 in accordance with an embodiment. System 300 includes a plurality of sockets 302-308 (four shown but some embodiments can have more or less socket). Each socket includes a processor and one or more of IOH 220, RC 222, and PCIe Controller 235. In some embodiments, IOH 220, RC 222, and/or PCIe Controller 235 can be present in one or more components of system 300 (such as those shown in FIG. 3). Further, more or less 220, 222, and/or 235 blocks are present in a system depending on the implementation. Additionally, each socket is coupled to the other sockets via a point-to-point (PtP) link, or a differential interconnect, such as a Quick Path Interconnect (QPI), MIPI (Mobile Industry Processor Interface), etc. As discussed with respect the network fabric 204 of FIG. 2, each socket is coupled to a local portion of system memory, e.g., formed by a plurality of Dual Inline Memory Modules (DIMMs) that include dynamic random access memory (DRAM).

In another embodiment, the network fabric may be utilized for any System on Chip (SoC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect Express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 3, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 412 of FIG. 4). In some embodiments, the memory controller (MC)/Home Agent (HA) (such as MC0/HA0 through MC3/HA3) can be the same or similar to agent 202-1 of FIG. 2 and the memory, labeled as MEM0 through MEM3, can be the same or similar to memory devices discussed with reference to any of the figures herein. Generally, processing/caching agents send requests to a home node for access to a memory address with which a corresponding "home agent" is associated. Also, in one embodiment, MEM0 through MEM3 can be configured to mirror data, e.g., as master and slave. Also, one or more components of system 300 can be included on the same integrated circuit die in some embodiments.

Furthermore, one implementation (such as shown in FIG. 3) is for a socket glueless configuration with mirroring. For example, data assigned to a memory controller (such as MC0/HA0) is mirrored to another memory controller (such as MC3/HA3) over the PtP links.

Figure 4:
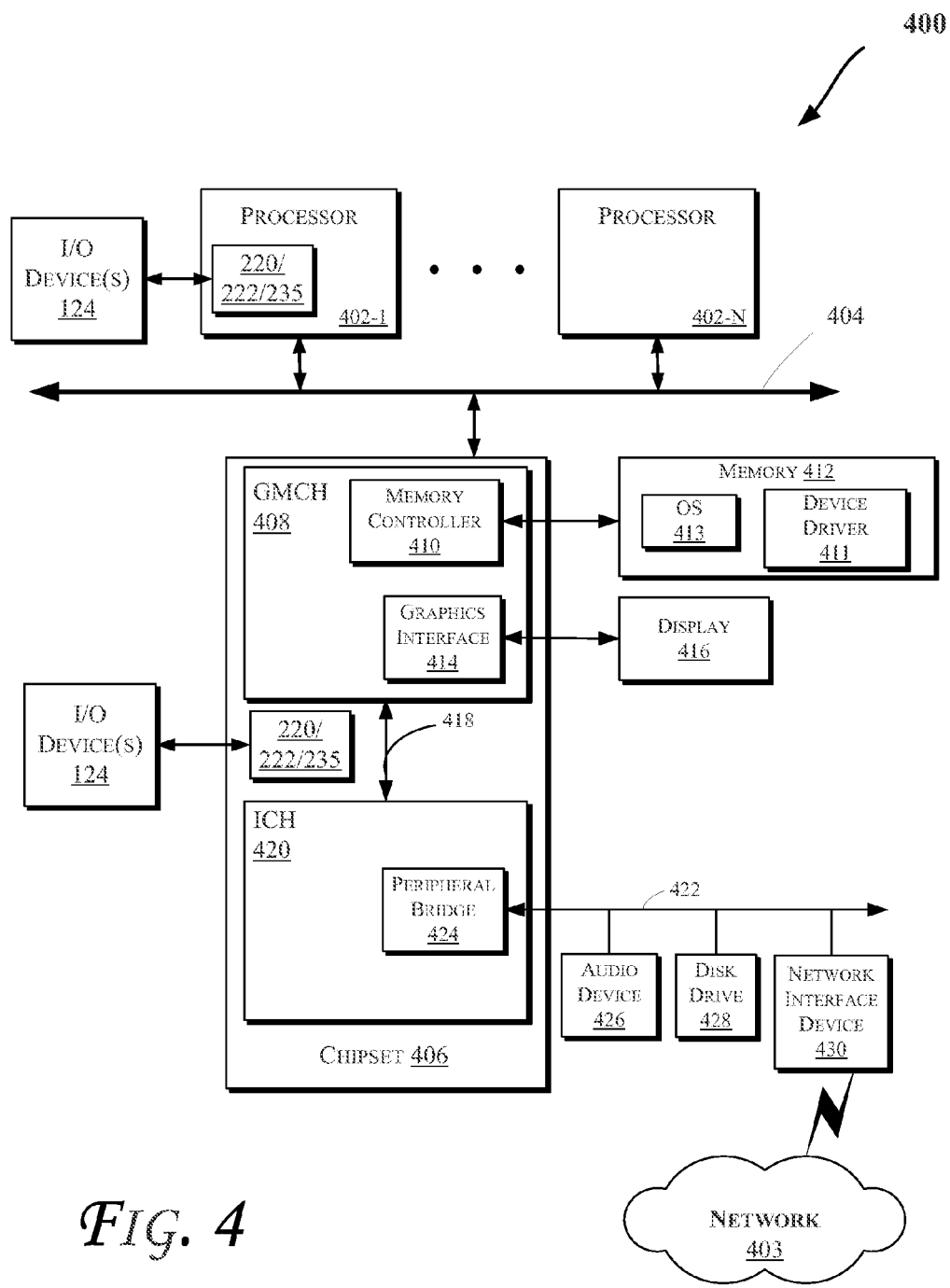
FIG. 4 illustrates a block diagram of an embodiment of a computing system, which is utilized to implement various embodiments discussed herein.

FIG. 4 illustrates a block diagram of a computing system 400 in accordance with an embodiment of the invention. The computing system 400 may include one or more central processing unit(s) (CPUs) 402-1 through 402-N or processors (collectively referred to herein as "processors 402" or more generally "processor 402") that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

Also, the operations discussed with reference to FIGS. 1A-3 may be performed by one or more components of the system 400. In some embodiments, the processors 402 may be the same or similar to the processors 302-308 of FIG. 3. Furthermore, the processors 402 (or other components of the system 400) may include one or more of the IOH 220, RC 222, and the PCIe Controller 235. Moreover, even though FIG. 4 illustrates some locations for items 220/122/135, these components may be located elsewhere in system 400. For example, I/O device(s) 224 may communicate via bus 422, etc.

A chipset 406 may also communicate with the interconnection network 404. The chipset 406 may include a graphics and memory controller hub (GMCH) 408. The GMCH 408 may include a memory controller 410 that communicates with a memory 412. The memory 412 may store data, including sequences of instructions that are executed by the CPU 402, or any other device included in the computing system 400. For example, the memory 412 may store data corresponding to an operation system (OS) 413 and/or a device driver 411 as discussed with reference to the previous figures. In an embodiment, the memory 412 and memory 240 of FIG. 2 may be the same or similar. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

Additionally, one or more of the processors 402 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 400. For example, the cache may locally cache data stored in a memory 412 for faster access by the components of the processors 402. In an embodiment, the cache (that may be shared) may include a mid-level cache and/or a last level cache (LLC). Also, each processor 402 may include a level 2 (L1) cache. Various components of the processors 402 may communicate with the cache directly, through a bus or interconnection network, and/or a memory controller or hub.

The GMCH 408 may also include a graphics interface 414 that communicates with a display device 416, e.g., via a graphics accelerator. In one embodiment of the invention, the graphics interface 414 may communicate with the graphics accelerator via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the GMCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the GMCH 408 in some embodiments of the invention. In addition, the processor 402 and one or more components of the GMCH 408 and/or chipset 406 may be combined to form a single integrated circuit chip (or be otherwise present on the same integrated circuit die).

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
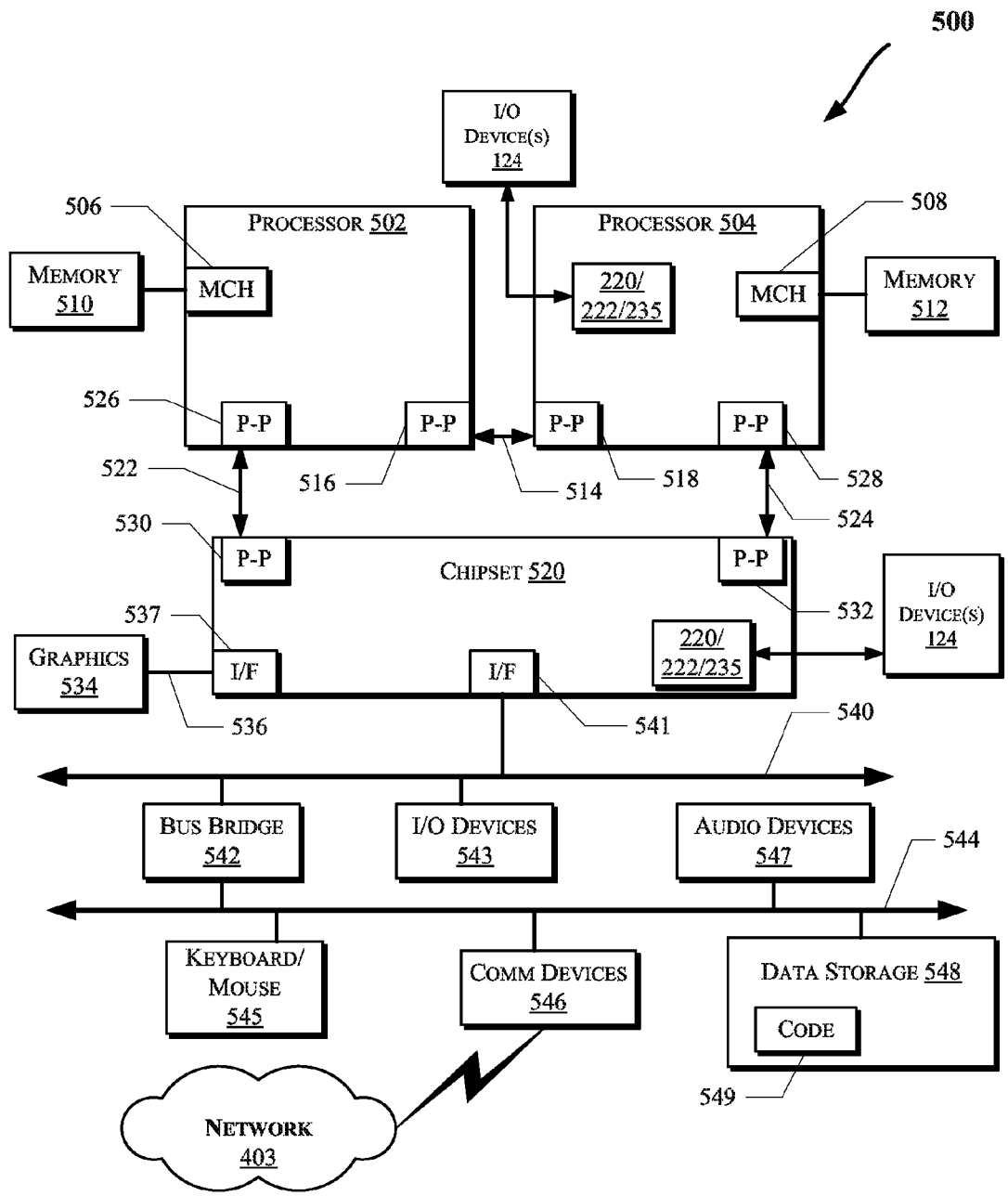
FIG. 5 illustrates a block diagram of an embodiment of a computing system, which is utilized to implement various embodiments discussed herein.

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1A-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4. As shown in FIG. 5, the processors 502 and 504 may also include the cache(s) discussed with reference to FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

At least one embodiment of the invention may be provided within the processors 502 and 504 or chipset 520. For example, the processors 502 and 504 and/or chipset 520 may include one or more of the IOH 220, RC 222, and the PCIe Controller 235. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5. Hence, location of items 220/122/135 shown in FIG. 5 is exemplary and these components may or may not be provided in the illustrated locations.

The chipset 520 may communicate with a bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device, and/or a data storage device 548. The data storage device 548 may store code 549 that may be executed by the processors 502 and/or 504.

In various embodiments of the invention, the operations discussed herein, e.g., with reference to FIGS. 1A-5, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1A-5. Additionally, such computer-readable media may be downloaded as a computer program product, wherein the program may be transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

The following examples pertain to further embodiments. Example 1 includes an apparatus comprising: logic to synchronize a first clock of a first agent with a second clock of a second agent based on one or more messages exchanged between the first agent and the second agent and a platform time, wherein the first agent and the second agent are coupled via a link. Example 2 includes the apparatus of example 1, wherein the one or more messages exchanged between the first agent and the second agent are to periodically obtain a snapshot of the platform time. Example 3 includes the apparatus of example 2, wherein the first agent and the second agent are to compare their local clocks with the snapshot of the platform time at a single point in time. Example 4 includes the apparatus of example 1, wherein the platform time is to comprise a system-wide master clock utilized by all agents in a system. Example 5 includes the apparatus of example 1, wherein the platform time is to be provided by a remote device that is external to a system that comprises the first agent and the second agent. Example 6 includes the apparatus of example 5, wherein the remote device is coupled to the system via a serial interface. Example 7 includes the apparatus of example 1, wherein the one or more messages are to comprise a message to cause a requesting agent to wait for a time period before reissuing a request. Example 8 includes the apparatus of example 1, wherein a requesting agent pulls time from a central time source instead of waiting for a broadcast from the central time source. Example 9 includes the apparatus of example 1, wherein the link is to comprise a Peripheral Component Interconnect Express (PCIe) link. Example 10 includes the apparatus of example 1, wherein the logic is to compare a threshold value and a time difference value, between arrival of a time snap message from a time source and a check limit determination at the time source, to determine whether a request is to be retried. Example 11 includes the apparatus of example 10, wherein a comparison failure message is to be sent to a requesting device in response to occurrence of at least one retry for the request.

Example 12 includes a method comprising: synchronizing a first clock of a first agent with a second clock of a second agent based on one or more messages exchanged between the first agent and the second agent and a platform time, wherein the first agent and the second agent are coupled via a link. Example 13 includes the method of example 12, further comprising periodically obtaining a snapshot of the platform time based on the one or more messages exchanged between the first agent and the second agent. Example 14 includes the method of example 13, further comprising the first agent and the second agent comparing their local clocks with the snapshot of the platform time at a single point in time. Example 15 includes the method of example 12, further comprising providing the platform time by a remote device that is external to a system that comprises the first agent and the second agent. Example 16 includes the method of example 12, further comprising transmitting a message to cause a requesting agent to wait for a time period before reissuing a request. Example 17 includes the method of example 12, further comprising a requesting agent pulling time from a central time source instead of waiting for a broadcast from the central time source. Example 18 includes the method of example 12, further comprising comparing a threshold value and a time difference value, between arrival of a time snap message from a time source and a check limit determination at the time source, to determine whether a request is to be retried. Example 19 includes the method of example 18, further comprising transmitting a comparison failure message to a requesting device in response to occurrence of at least one retry for the request.

Example 20 includes a system comprising: a processor to comprise a first agent and a second agent; and logic to synchronize a first clock of the first agent with a second clock of the second agent based on one or more messages exchanged between the first agent and the second agent and a platform time, wherein the first agent and the second agent are coupled via a link. Example 21 includes the system of example 20, wherein the one or more messages exchanged between the first agent and the second agent are to periodically obtain a snapshot of the platform time. Example 22 includes the system of example 20, wherein the platform time is to comprise a system-wide master clock utilized by all agents in a system. Example 23 includes the system of example 20, wherein the platform time is to be provided by a remote device that is external to a system that comprises the first agent and the second agent. Example 24 includes the system of example 20, wherein a requesting agent pulls time from a central time source instead of waiting for a broadcast from the central time source. Example 25 includes the system of example 20, wherein the logic is to compare a threshold value and a time difference value, between arrival of a time snap message from a time source and a check limit determination at the time source, to determine whether a request is to be retried.

Example 26 includes an apparatus comprising: logic to allow a first agent to fulfill a timing request from a second agent based on a value stored in a local time copy storage device and a counter that keeps track of elapsed time during a period associated with fulfillment of the timing request by the logic, wherein the first agent is coupled between the second agent and a third agent via two links. Example 27 includes the apparatus of example 26, wherein one or more messages exchanged between the first agent and the second agent are to periodically obtain a snapshot of a platform time. Example 28 includes the apparatus of example 27, wherein the first agent and the second agent are to compare their local clocks with the snapshot of the platform time at a single point in time. Example 29 includes the apparatus of example 27, wherein the platform time is to comprise a system-wide master clock utilized by all agents in a system. Example 30 includes the apparatus of example 27, wherein the platform time is to be provided by a remote device that is external to a system that comprises the first agent and the second agent. Example 31 includes the apparatus of example 30, wherein the remote device is coupled to the system via a serial interface. Example 32 includes the apparatus of example 27, wherein the one or more messages are to comprise a message to cause a requesting agent to wait for a time period before reissuing a request. Example 33 includes the apparatus of example 26, wherein a requesting agent pulls time from a central time source instead of waiting for a broadcast from the central time source. Example 34 includes the apparatus of example 26, wherein the logic is to compare a threshold value and a time difference value, between arrival of a time snap message from a time source and a check limit determination at the time source, to determine whether a request is to be retried. Example 35 includes the apparatus of example 34, wherein a comparison failure message is to be sent to a requesting device in response to occurrence of at least one retry for the request.

Example 36 includes an apparatus comprising: logic, coupled to a first agent and in response to a request from a second agent, to respond with a message to cause the second agent to wait for a time period and resend the request if the first agent determines that it does not have sufficient information to respond to the request, wherein the first agent and the second agent are coupled via a link. Example 37 includes the apparatus of example 36, wherein one or more messages exchanged between the first agent and the second agent are to periodically obtain a snapshot of the platform time. Example 38 includes the apparatus of example 37, wherein the first agent and the second agent are to compare their local clocks with the snapshot of the platform time at a single point in time. Example 39 includes the apparatus of example 36, wherein the platform time is to comprise a system-wide master clock utilized by all agents in a system. Example 40 includes the apparatus of example 36, wherein the platform time is to be provided by a remote device that is external to a system that comprises the first agent and the second agent. Example 41 includes the apparatus of example 40, wherein the remote device is coupled to the system via a serial interface. Example 42 includes the apparatus of example 36, wherein the one or more messages are to comprise a message to cause a requesting agent to wait for a time period before reissuing a request. Example 43 includes the apparatus of example 36, wherein a requesting agent pulls time from a central time source instead of waiting for a broadcast from the central time source. Example 44 includes the apparatus of example 36, wherein the logic is to compare a threshold value and a time difference value, between arrival of a time snap message from a time source and a check limit determination at the time source, to determine whether a request is to be retried. Example 45 includes the apparatus of example 44, wherein a comparison failure message is to be sent to a requesting device in response to occurrence of at least one retry for the request.

Example 46 includes an apparatus comprising: logic to allow a first agent to fulfill a timing request from a second agent in response to a request by the second agent and based on one of a locally stored time and a response to the request that is forwarded to a third agent, wherein the third agent is above the first agent in a system hierarchy, wherein the first agent and the second agent are coupled via a link. Example 47 includes the apparatus of example 46, wherein one or more messages exchanged between the first agent and the second agent are to periodically obtain a snapshot of the platform time. Example 48 includes the apparatus of example 47, wherein the first agent and the second agent are to compare their local clocks with the snapshot of the platform time at a single point in time. Example 49 includes the apparatus of example 47, wherein the platform time is to comprise a system-wide master clock utilized by all agents in a system. Example 50 includes the apparatus of example 47, wherein the platform time is to be provided by a remote device that is external to a system that comprises the first agent and the second agent. Example 51 includes the apparatus of example 50, wherein the remote device is coupled to the system via a serial interface. Example 52 includes the apparatus of example 47, wherein the one or more messages are to comprise a message to cause a requesting agent to wait for a time period before reissuing a request. Example 53 includes the apparatus of example 46, wherein a requesting agent pulls time from a central time source instead of waiting for a broadcast from the central time source. Example 54 includes the apparatus of example 46, wherein the logic is to compare a threshold value and a time difference value, between arrival of a time snap message from a time source and a check limit determination at the time source, to determine whether a request is to be retried. Example 55 includes the apparatus of example 54, wherein a comparison failure message is to be sent to a requesting device in response to occurrence of at least one retry for the request.

Example 56 includes the apparatus of any of examples 1 to 55, wherein the link is to comprise a Peripheral Component Interconnect Express (PCIe) link.

Example 57 includes a computer-readable medium comprising one or more instructions that when executed on a processor configure the processor to perform one or more operations to of any of examples 12 to 19.

Example 58 includes an apparatus comprising: means for synchronizing a first clock of a first agent with a second clock of a second agent based on one or more messages exchanged between the first agent and the second agent and a platform time, wherein the first agent and the second agent are coupled via a link. Example 59 includes the apparatus of example 58, further comprising means for periodically obtaining a snapshot of the platform time based on the one or more messages exchanged between the first agent and the second agent. Example 60 includes the apparatus of example 59, further comprising means for the first agent and the second agent comparing their local clocks with the snapshot of the platform time at a single point in time. Example 61 includes the apparatus of example 58, further comprising means for providing the platform time by a remote device that is external to a system that comprises the first agent and the second agent. Example 62 includes the apparatus of example 58, further comprising means for transmitting a message to cause a requesting agent to wait for a time period before reissuing a request. Example 63 includes the apparatus of example 58, further comprising means for a requesting agent pulling time from a central time source instead of waiting for a broadcast from the central time source. Example 64 includes the apparatus of example 58, further comprising means for comparing a threshold value and a time difference value, between arrival of a time snap message from a time source and a check limit determination at the time source, to determine whether a request is to be retried. Example 65 includes the apparatus of example 64, further comprising means for transmitting a comparison failure message to a requesting device in response to occurrence of at least one retry for the request.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
logic, at least a portion of which is in hardware, to synchronize a first clock of a first agent with a second clock of a second agent based on one or more messages exchanged between the first agent and the second agent and a platform time,
wherein the first agent and the second agent are coupled via a link, wherein the first agent is to determine an adjusted system wide master time corresponding to the first clock of the first agent based at least in part on a link delay, wherein the link delay is to be determined based at least in part on a time it takes for a message from the one or more messages to transit a transmission medium, wherein the transmission medium is to be formed via the link between the first agent and the second agent, wherein the first agent or the second agent is to comprise a counter to keep track of consumed clock cycles while the one or more messages are exchanged to allow the logic to remain dormant until a request arrives.

2. The apparatus of claim 1, wherein the one or more messages exchanged between the first agent and the second agent are to periodically obtain a snapshot of the platform time.

3. The apparatus of claim 2, wherein the first agent and the second agent are to compare their local clocks with the snapshot of the platform time at a single point in time.

4. The apparatus of claim 1, wherein the platform time is to comprise a system-wide master clock utilized by all agents in a system.

5. The apparatus of claim 1, wherein the platform time is to be provided by a remote device that is external to a system that comprises the first agent and the second agent.

6. The apparatus of claim 5, wherein the remote device is coupled to the system via a serial interface.

7. The apparatus of claim 1, wherein the one or more messages are to comprise a message to cause a requesting agent to wait for a time period before reissuing a request.

8. The apparatus of claim 1, wherein a requesting agent pulls time from a central time source instead of waiting for a broadcast from the central time source.

9. The apparatus of claim 1, wherein the link is to comprise a Peripheral Component Interconnect Express (PCIe) link.

10. The apparatus of claim 1, wherein the logic is to compare a threshold value and a time difference value, between arrival of a time snap message from a time source and a check limit determination at the time source, to determine whether a request is to be retried.

11. The apparatus of claim 10, wherein a comparison failure message is to be sent to a requesting device in response to occurrence of at least one retry for the request.

12. The apparatus of claim 1, wherein the link delay is to be determined based at least in part on an average of a difference between a first time difference and a second time difference, wherein the first time difference and the second time difference are to be determined based at least in part on: a first time a request is sent, a second time the first request is received, a third time a response to the request is sent, and a fourth time the response is received.

13. A method comprising:
synchronizing a first clock of a first agent with a second clock of a second agent based on one or more messages exchanged between the first agent and the second agent and a platform time, wherein the first agent and the second agent are coupled via a link, wherein the first agent determines an adjusted system wide master time corresponding to the first clock of the first agent based at least in part on a link delay, wherein the link delay is determined based at least in part on a time it takes for a message from the one or more messages to transit a transmission medium, wherein the transmission medium is formed via the link between the first agent and the second agent, wherein the first agent or the second agent comprise a counter to keep track of consumed clock cycles while the one or more messages are exchanged to allow for logic to remain dormant until a request arrives.

14. The method of claim 13, further comprising periodically obtaining a snapshot of the platform time based on the one or more messages exchanged between the first agent and the second agent.

15. The method of claim 14, further comprising the first agent and the second agent comparing their local clocks with the snapshot of the platform time at a single point in time.

16. The method of claim 13, further comprising a requesting agent pulling time from a central time source instead of waiting for a broadcast from the central time source.

17. The method of claim 13, further comprising comparing a threshold value and a time difference value, between arrival of a time snap message from a time source and a check limit determination at the time source, to determine whether a request is to be retried.

* * * * *